United States Patent [19]

Kemper

[11] 4,233,859
[45] Nov. 18, 1980

[54] INFINITELY VARIABLE TRANSMISSION UNIT AND SYSTEM INCORPORATING SAME

[75] Inventor: Yves J. Kemper, Birmingham, Mich.

[73] Assignee: Vadetec Corporation, Troy, Mich.

[21] Appl. No.: 80,221

[22] Filed: Oct. 1, 1979

Related U.S. Application Data

[63] Continuation of Ser. No. 955,264, Jul. 31, 1979, abandoned.

[51] Int. Cl.³ .................. F16H 37/06; F16H 15/16
[52] U.S. Cl. ................................. 74/690; 74/191
[58] Field of Search .................... 74/690, 191, 192

[56] References Cited

U.S. PATENT DOCUMENTS

| RE. 293,328 | 8/1977 | Kemper | 74/690 X |
|---|---|---|---|
| 1,207,216 | 12/1916 | Roberts | 74/193 |
| 1,242,618 | 10/1917 | Stevens | 74/690 |
| 1,709,346 | 4/1929 | Garrard | 74/690 X |
| 2,126,508 | 8/1938 | Schmitter | 74/281 |
| 2,353,136 | 7/1944 | Bade | 74/690 |
| 3,299,744 | 1/1967 | Kraus | 74/690 X |
| 3,406,597 | 10/1968 | Perry | 74/865 |
| 3,695,120 | 10/1972 | Titt | 74/690 |
| 4,098,145 | 7/1978 | Dickinson | 74/690 |

FOREIGN PATENT DOCUMENTS

| 2533475 | 10/1978 | Fed. Rep. of Germany . |
| 1227486 | 8/1960 | France . |
| 1338321 | 8/1963 | France . |

Primary Examiner—Leslie Braun
Attorney, Agent, or Firm—Robert F. Ziems

[57] ABSTRACT

An infinitely variable (I.V.) transmission unit having a single input and at least two independently rotatable outputs driven by rolling friction surfaces with a variable radius ratio and by unit contained gearing. The separate output shafts are coupled with distinct gear reduction functions to a single I.V. functioning or working unit to enable different output/input speed ratio ranges to be achieved by each unit output.

The unit is combined with a simple external gear set and clutching to provide diverse system operation in which the range of I.V. operation is enlarged. Also, synchronous operation of the system is achieved with no external epicyclic gear operation.

13 Claims, 7 Drawing Figures

INFINITELY VARIABLE TRANSMISSION UNIT AND SYSTEM INCORPORATING SAME

CROSS-REFERENCE TO RELATED APPLICATION

This is a continuation of application Ser. No. 955,264, filed July 31, 1979 and now abandoned.

BACKGROUND OF THE INVENTION

This invention relates to improvements in infinitely variable transmissions and more particularly, it concerns an infinitely variable transmission unit adaptable for use in a mechanical power transmission system in a manner such that the range of the speed ratios available as a result of unit design is enlarged substantially in operation of the system.

Mechanical power transmissions which transmit torque from an input to an output at infinitely variable speed ratios are well known in the art and generally referred to as "I.V. transmissions". Because the power generating efficiency of most engines or prime movers is highest in only a limited range of operating speeds, I.V. transmissions have and continue to generate much interest as a potentially ideal solution to the transmission of power from a power source to a power-consuming load which must be driven at speeds varying from the operating speeds of the power source.

Mechanical I.V. transmissions are generally embodied in a structural organization capable of transmitting torque by friction between two or more traction surfaces on relatively rotatable bodies supported in such a manner as to enable the traction surfaces to be retained against one another under a normal force adequate to prevent slippage between the surfaces. The infinitely variable speed ratio is achieved by designing the torque arm or radius of one of the bodies to be continuously variable relative to the radius of the other body. The geometric configuration of two such bodies capable of attaining this result is exemplified by a wheel shiftable axially on a disc or a ring shiftable along the axis of a cone.

In a commonly assigned U.S. Pat. No. 4,152,946, issued May 8, 1979, in the name of the present inventor, several embodiments of infinitely variable transmissions are disclosed in which three frame supported working bodies operate to transmit a mechanical power input to a rotatable output at infinitely variable output/input speed ratios within the design range of the transmission. For purposes of definition in this background discussion as well as in the ensuing detailed description of the present invention and in the appended claims, the three working bodies may be termed respectively, an "alpha body" which is supported by the transmission frame for rotation on a first axis, a "beta body" which is concentric with a second axis inclined with respect to and intersecting the first axis at a point of axes intersection, and an "omega body" carried by the frame to be concentric with the first axis. Although both the omega body and the beta body may be rotatable on the respective axes with which they are concentric, it may be assumed for purposes of the present discussion that the omega body is held against rotation to provide a reaction torque whereas the beta body is rotatable on the second axis or journalled in the alpha body.

The infinitely variable speed ratio capability of such transmissions is achieved by providing one of the beta and omega bodies with a pair of rolling surfaces which are of revolution about the concentric body axis and which are of variable radii along that axis in symmetry with the point of first and second axes intersection. Physically, such rolling surfaces will thus provide the one body with a biconical-like configuration. The other of the beta and omega bodies is provided with a pair of rolling surfaces which are also of revolution about the concentric body axis but which are of relatively constant radius. The pairs of rolling surfaces on the beta and omega bodies are retained in frictional engagement with each other at two contact points or zones capable of positional adjustment to vary the ratio of the beta body surface radius ($R_b$) to the omega body surface radius ($R_w$). Thus, when an input torque is applied to the alpha body, causing it to rotate at a velocity $\dot{\alpha}$ about the first axis, the beta body is carried in nutation by the alpha body and with the rolling surfaces thereof in torque transmitting contact with the rolling surfaces of the omega body. If the rotational speed of the beta body about the second axis is ($\dot{\beta}$) and the rotational speed of the omega body on the first axis is $\dot{\omega}$, then the respective speeds of the three bodies are related by the equation:

$$\dot{\omega} - \dot{\alpha} + (\dot{\alpha} - \dot{\beta})R_b/R_w = 0$$

Because one of either the beta or the alpha body extends within the other of such bodies, the radius ratio $R_b/R_w$ may represent a value of either less than 1 (where $R_b$ is always less than $R_w$) or more than 1 (where $R_b$ is always greater than $R_w$). If the function $\rho$ is accepted as designating either $R_b/R_w$ or the reciprocal $R_w/R_b$, whichever is greater than 1, and the omega body is held against rotation as aforesaid so that $\dot{\omega}$ equals 0, then the general equation of relative speeds is simplified to:

$$(\dot{\alpha} - \dot{\beta})\rho - \dot{\alpha} = 0$$

Also, where unit output is from the beta body, as it is when the omega body is retained against rotation on the first axis, the beta body is linked with an output shaft rotatable on the first axis by unit gearing originating with a pinion gear coupled for rotation with the beta body on the second axis and ending with a sun gear keyed for rotation with the unit output shaft. Such gearing may have a ratio factor (k) which theoretically may be of any value and also may be made either positive or negative depending on whether the unit gearing includes a reversing idler or not. In light of the foregoing, where $\dot{\theta}$ is unit output speed and taking into account the unit gearing ratio (k), the output/input speed ratio of the unit is determined by the equation:

$$\dot{\theta}/\dot{\alpha} = 1 - k\rho.$$

The state-of-the-art relating to I.V. transmissions and systems incorporating same is further developed to a point where speed ratio range of unit may be enlarged by external epicyclic gearing in which the I.V. unit input and output are used as two inputs to the external epicyclic gearing in a way to drive a single system output shaft from the epicyclic gearing. Such systems, moreover, have accounted for synchronous operation in which the system may be shifted between one range of infinitely variable speed ratios with adjustment of the I.V. unit in one direction between the extreme limits of its radius ratio, and a second contiguous range of system speed ratios in which the I.V. unit is adjusted in the opposite direction between its limits of speed ratio variation. In this respect, see U.S. Pat. No. 3,406,597, issued Oct. 22, 1968, to F. G. De Brie Perry, et al. While the use of such external epicyclic gearing to enlarge the speed ratio range available in an I.V. transmission unit represents a highly satisfactory solution to the problem of expanding the range of speed ratios available in an I.V. transmission, epicyclic gear operation is objectionable from the standpoint of introducing efficiency losses in the system. In other words, while synchronous operation of the I.V. transmission minimizes energy losses as a result of shifting between gearing ratio increments, the efficiency gain attained by such synchronous operation is offset by losses in external epicyclic gear operation.

SUMMARY OF THE INVENTION

In accordance with the present invention, the structural organization of alpha, beta and omega bodies of the previously disclosed I.V. transmission unit is retained to provide at least two different unit ranges of output/input speed ratios. The alpha body is again driven in rotation by a single unit input to carry the beta body into nutation and develop variable speed rotation of the beta body on the second axis as a result of rolling friction contact between the beta surfaces thereon with omega surfaces which are held or fixed against rotation about the first axis. Unit gearing also includes a drive pinion keyed for rotation at one end of the beta body. The drive pinion will, therefore, be translated in an orbital path about the first axis as in prior transmission embodiments. The drive pinion of the present invention, however, is in mesh with at least two driven gears of different diameters and separately coupled with a pair of unit output shafts which are preferably concentric with the first axis. The dual range output shafts of the I.V. unit are alternately coupled with a system output shaft by apropriate clutching.

In one embodiment of the system of the present invention, one of the two unit output shafts is arranged to drive the system output through simple external gearing whereas the other of the two unit output shafts may be coupled by a clutch directly with system output. In another system embodiment, the unit output shafts are alternately connected through simple gearing to the system output shaft. In both instances, synchronous operation of the I.V. unit through two or more ranges of system speed ratios is made possible by appropriate choice of gearing; system output may be reversed either by unit gearing or by the external gearing; and either one of the unit output shafts may be under-driven or over-driven by the external gearing to provide system output speeds lower or higher, respectively, than input speeds.

Accordingly, among the objects of the present invention are: the provision of an I.V. transmission unit having a single torque input and two or more outputs capable of providing different ranges of output/input speed ratios; the provision of such an I.V. unit in which at least one of the two outputs may be operated in a range of speed ratios by which an output may be driven in the same direction as the unit output, in the opposite direction of the unit input and at zero rotation relative to the unit input; the provision of such an I.V. unit in which the separate unit outputs may be combined by simple external gearing to provide an infinitely variable transmission system permitting synchronous operation of the I.V. unit through two or more ranges of system speed ratios; the provision of an infinitely variable transmission system which enables synchronous operation in at least two ranges of system speed ratios; the provision of such a system which is adaptable very simply to varying conditions of operation; and the provision of such a system which is capable of operation at high power transmitting efficiencies.

Other objects and further scope of applicability of the present invention will become apparent from the detailed description to follow taken in conjunction with the accompanying drawings in which like parts are designated by like reference characters.

DETAILED DESCRIPTION OF THE PREFERRED EMBODIMENTS

Figure 1:
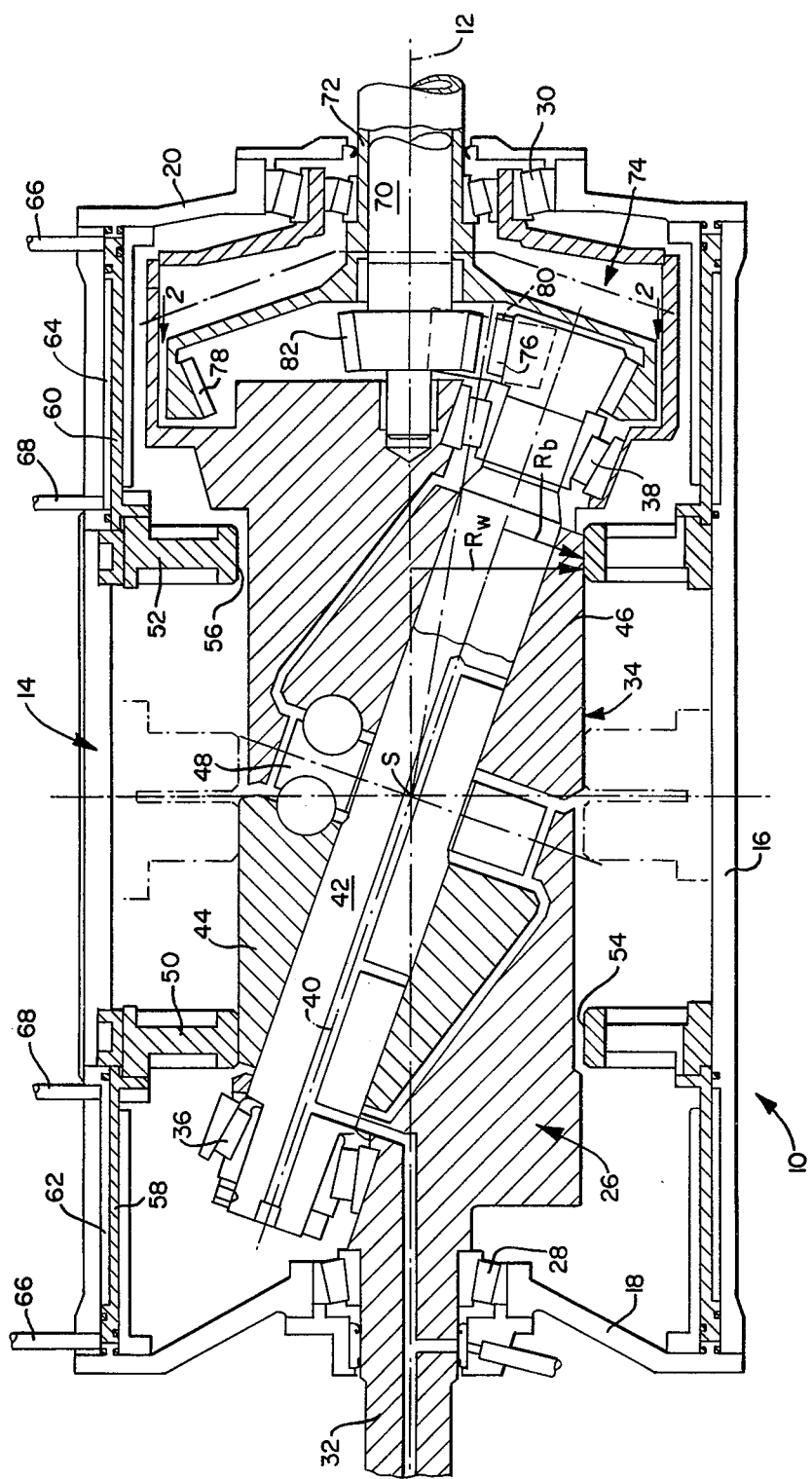
FIG. 1 is a longitudinal cross-section through an I.V. transmission unit in accordance with the present invention.

In FIG. 1 of the drawings, a preferred embodiment of an I.V. unit in accordance with the present invention is designated generally by the reference numeral 10. The longitudinal cross-section of FIG. 1 is in a plane containing the primary or first axis 12 of the I.V. unit 10. The axis 12 is physically established by a fixed frame 14 having a generally cylindrical mid-section 16 and a pair of journalled end sections 18 and 20.

I.V. unit components positioned within the frame 14 include a crank-like alpha body 26 journalled by bearings 28 and 30 in the frame end sections 18 and 20 for rotation about the primary or first axis 12. A unit input shaft 32 is connected directly to the alpha body 26 and is thus concentric with the axis 12. A nutatable beta body, generally designated by the reference numeral 34, is supported by bearings 36 and 38 in the alpha body 26 for rotation about a second axis 40 inclined with respect to and intersecting the first axis 12 at a point S of axes intersection. In the disclosed embodiment, the beta body 34 includes a central supporting shaft 42 on which a pair of oppositely convergent conical members 44 and 46 are supported for some measure of both axial and rotational movement relative to the shaft 42. A ball-/ramp unit 48 is slidably keyed or splined on the shaft 42 between the cone members 44 and 46. While the unit 48 is not fully illustrated as to structural detail, for a complete understanding of the present invention it is necessary only to appreciate that the unit 48 functions to bias the cone members in opposite directions away from the point S in response to a torque differential between the shaft 42 and the cone members 44 and 46. It will be noted also that the conical surfaces of the members 44 and 46, also referred to herein as beta surfaces, are concentric with the second axis 40 and are of a variable radius $R_b$ with respect to that axis.

The axial bias of the cone members 44 and 46 by the ball/ramp unit 48 along the shaft 42, coupled with the angular relationship of the axis 40 as well as the configuration of the conical members, causes the conical beta surfaces on the members 44 and 46 to be urged into engagement with an omega body established in the disclosed embodiment by a pair of axially adjustable rings 50 and 52 defining interior omega rolling surfaces 54 and 56 which are of revolution about the primary axis 12 and of a constant radius $R_w$. The rings 50 and 52 are secured against rotation in the frame section 16 and are fixed at the inner ends of annular piston members 58 and 60 operably positioned respectively in annular chambers 62 and 64. The chambers 62 and 64 are ported to hydraulic fluid conduits 66 and 68 in such a manner that pressurized control fluid introduced to the chambers 62 and 64 through the conduits 66 and vented from the conduits 68 will cause the pistons and thus the rings 50 and 52 to move inwardly along the axis 22 toward the point S of axes intersection. Conversely, pressurized fluid introduced through the lines 68 accompanied by an exhausting of fluid from the line 66 will cause the rings to move in the opposite direction. Although not shown in the drawings, it is also possible that the rings be mechanically connected in a manner to assure synchronized movement toward and away from the point S.

The organization of the frame 14 as well as the alpha body 26, beta body 34 and the omega body as established by the rings 50 and 52, is similar both structurally and functionally to the disclosure of the aforementioned U.S. Pat. No. 4,152,946. In accordance with the present invention, however, the unit 10 includes two unit output shafts 70 and 72. As shown in FIG. 1, shaft 72 is hollow and concentric with both the shaft 70 and the first axis 12. Both shafts are independently rotatable and coupled by unit gearing 74 to be driven by the beta body 34. In particular, a drive pinion 76 is keyed for rotation with the beta body about the second axis 40 and also translatable upon nutation of the beta body through an orbital path concentric with the first axis 12. The drive pinion 76 thus travels in the same manner as a planet gear in an epicyclic gear set.

The drive pinion 76 is in direct meshing engagement with a ring gear 78 coupled directly with the hollow output shaft 72. The drive pinion also meshes with an idler gear 80 carried rotatably on its axis by the alpha body 26. The idler gear additionally meshes with a central or sun gear 82 keyed or otherwise directly coupled to the central output shaft 70.

As indicated previously, the speed relationships of the alpha ($\mathring{\alpha}$) and the beta ($\mathring{\beta}$) bodies 26 and 34, where the omega body is restrained against rotation about the first axis 12, and where $\rho$ in this case equals $R_w/R_b$ to be of a value always greater than 1, are determined by the equation:

$$\mathring{\beta} - \mathring{\alpha}(1-\rho) = 0.$$

Figure 2:
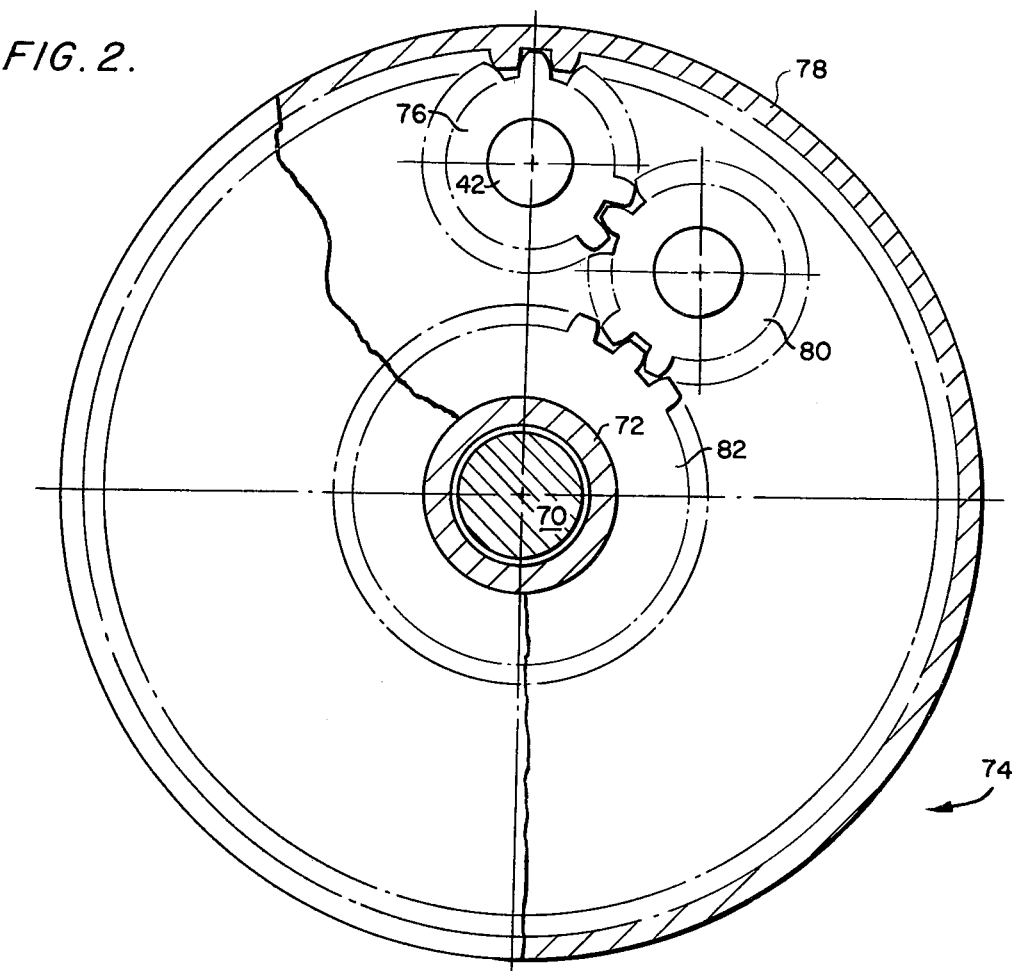
FIG. 2 is a schematic cross-section on line 2—2 of FIG. 1.

From FIG. 2 of the drawings it will be noted that the unit gearing 74 is an epicyclic gear set in which the rotational velocity ($\mathring{\theta}$) of either of the output shafts 70 or 72 is a function of both $\mathring{\alpha}$ and $\mathring{\beta}$ as well as the gearing ratio determined by the respective diameter of the gears 76 and 82 or 76 and 78. Specifically, if the diameter of the gear 76 divided by the diameter of the gear 82 is equated to a function k, then the velocity components $\mathring{\theta}$, $\mathring{\alpha}$ and $\mathring{\beta}$ are related by the equation:

$$k = (\mathring{\theta} - \mathring{\alpha}) \div (\mathring{\beta} - \mathring{\alpha}).$$

Because of the speed relationships of $\mathring{\beta}$, $\mathring{\alpha}$ and $\rho$ in the equation previously given, the speed and direction of rotation at each of the unit output shafts is related to the speed and direction of rotation of the unit input shaft or $\mathring{\alpha}$ by the equation:

$$\mathring{\theta} = \mathring{\alpha}(1 - k\rho).$$

Figure 3:
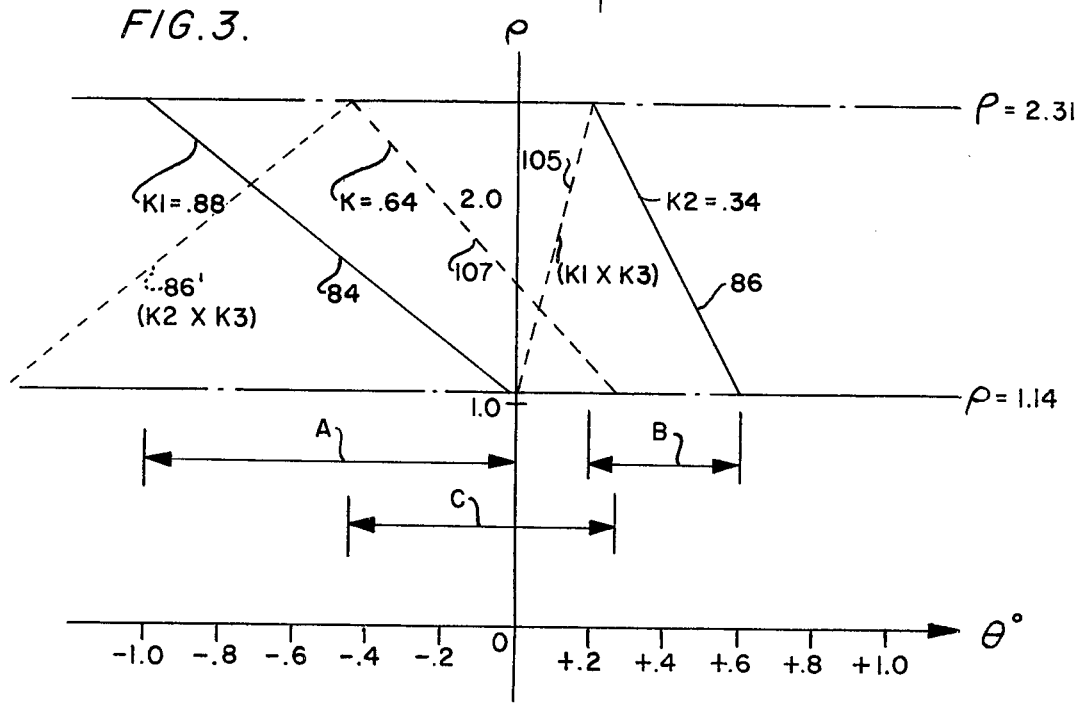
FIG. 3 is a graph including linear curves representing various gearing reduction factors in relation to transmission ratio changes and output speed.

The significance of the function k may be appreciated by the graph in FIG. 3 of the drawings. In the graph, actual values of the function $\rho$ are assumed to extend between a minimum of 1.14 and a maximum of 2.31. The values of $\rho$ are represented on the coordinates of the graph in FIG. 3. The values of output speed $\mathring{\theta}$ as a fraction of the input speed $\mathring{\alpha}$, are represented on the abscissa of the graph. Thus, if k1 represents the diameter ratio of the gear 76 and the gear 82 keyed to the central output shaft 70, and k1 is selected to have a value of 0.88, it will be observed by the line 84 in FIG. 3 that as $\rho$ is varied from minimum to maximum, the output shaft 70 will be driven at a velocity $\mathring{\theta}1$ which varies from zero to unity with the input velocity $\mathring{\alpha}$. It will also be noted that the direction of $\mathring{\theta}1$ rotation is the reverse of the input and therefore a negative value.

If the diametric ratio of the drive pinion 76 to the ring gear 78 is selected to be 0.34, the variation in the rotational velocity of the hollow output shaft 72 will vary along the line on curve 86 in FIG. 3. In particular, the values will be in the same direction as input rotation or positive and vary from approximately 0.2 to 0.6 times the velocity of input rotation. Also, the ranges of speed ratios available with unit operation driving the shafts 70 and 72 are represented respectively by the dimensions A and B in FIG. 3.

Figure 4:
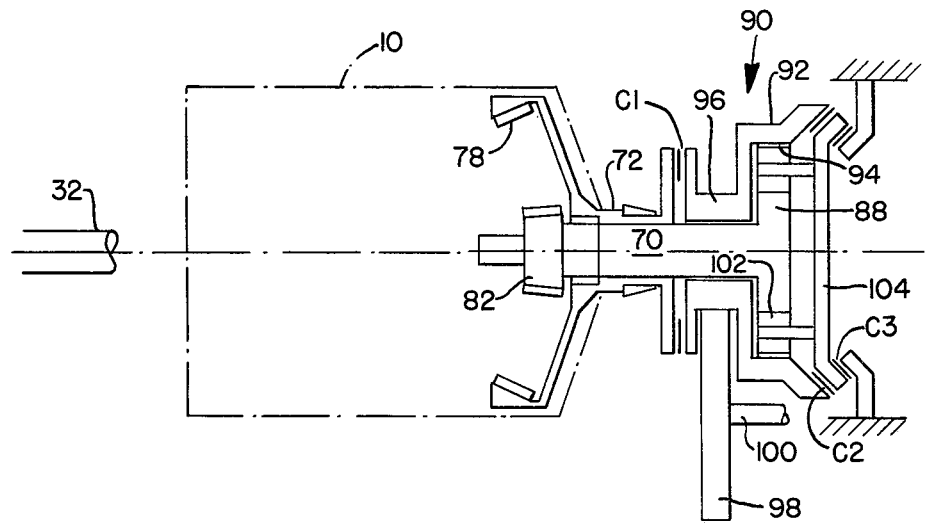
FIG. 4 is a schematic representation of one embodiment of an infinitely variable transmission system in accordance with the present invention.
Figure 5:
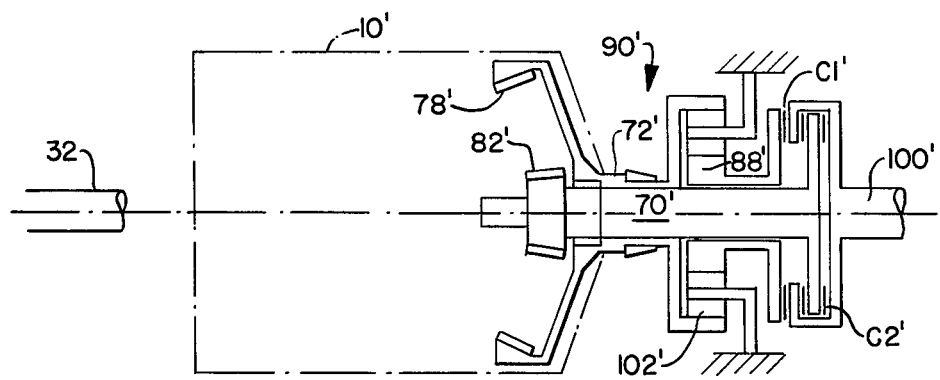
FIG. 5 is an alternative embodiment of a transmission system in accordance with the present invention.
Figure 6:
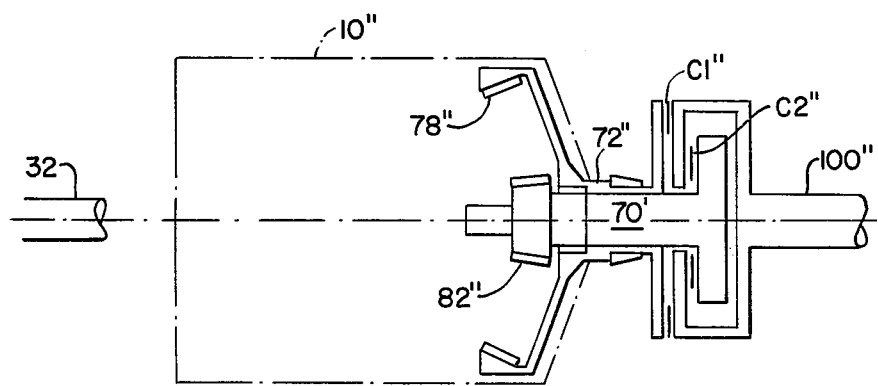
FIG. 6 is still another embodiment of a transmission system in accordance with the invention.

In FIGS. 4-6 of the drawings, three alternative embodiments of infinitely variable transmission systems are shown. In each case, system input is connected directly with the unit input shaft 32 and the structure of the I.V. unit 10 is the same as that described above with reference to FIGS. 1 and 2 of the drawings.

The system embodiment depicted in FIG. 4 of the drawings is intended for such applications as off-road vehicles where an equal range of speed ratios is preferred in both forward and reverse directions. In this system, the sun gear pinion 82 and the central shaft 70 are connected directly to a central gear 88 of an external gear set 90. The ring gear 78 of the unit 10 is releasably coupled by a clutch C1 to a gear unit 92 defining an internal ring gear 94 of the external gear set 90. The gear unit 92 further includes a gear 96 in mesh with a gear 98 keyed to the system output shaft 100. Pinion gears 102, rotatably supported on their respective axes from a carrier 104, mesh both with the central gear 88 and the ring gear 94 of the external gear set 90. The carrier 104 is adapted to be releasably coupled with the gear unit 92 by a clutch C2 or releasably grounded by a clutch C3 which, when energized will retain the carrier 104 against rotation.

In the system illustrated in FIG. 4, the unit parameters are presumed to be those described above with respect to FIG. 3 of the drawings. In other words, the gear ratio by which the unit drive pinion 76 is coupled with the sun gear 82 or k1 is equal to 0.88; the gear ratio by which the drive pinion 76 is coupled with the gear 78 or k2 is equal to 0.34; and the rolling surface radius ratio $\rho$ of the I.V. unit 10 assumed to be variable between values of 1.14 and 2.31. In addition, the gear ratio of the external gear set 90 is selected to be −0.21. It will be also understood that clutches C1, C2 and C3 may be alternately engaged or released by an appropriate control system (not shown).

Given the aforementioned parameters, operation of the system illustrated in FIG. 4, assuming a constant unidirectional rotation of the input shaft 32, begins with the function $\rho$ at its minimum value or 1.14, with clutches C1 and C2 disengaged and with the clutch C3 engaged to hold the carrier 104 against rotation. In this condition of operation, output torque from the I.V. unit 10 will be directed through the sun gear 82 and the central output shaft 70 to drive the central gear 88 of the external gear set 90. The pinion gear 102 in mesh with both the central gear 88 and the ring gear 94 will function as speed reduction gearing and directional reversing gearing to drive the gear unit 92 in a forward direction. As a result of the gears 96 and 98, the system output shaft 100 will be driven. The speed at which the output shaft 100 will be driven will vary as the function $\rho$ of the unit 10 is varied. The direction and range through which the system output shaft will be driven in this mode of operation, however, will be determined also by the gearing function k3 of the external gear set 90. The result of this operation is represented by the dashed line 105 in FIG. 3 of the drawings.

When the I.V. unit function $\rho$ reaches its maximum value of 2.31, clutches C2 and C3 are disengaged and the clutch C1 engaged so that the unit ring gear 78 is connected directly with the gear unit 92 of the external gear set 90. By then decreasing the value $\rho$ from its maximum value back to its minimum value 1.14, the speed of the system output shaft 100 will increase at values proportional to those represented by the line or curve 86 in FIG. 3 of the drawings.

Figure 7:
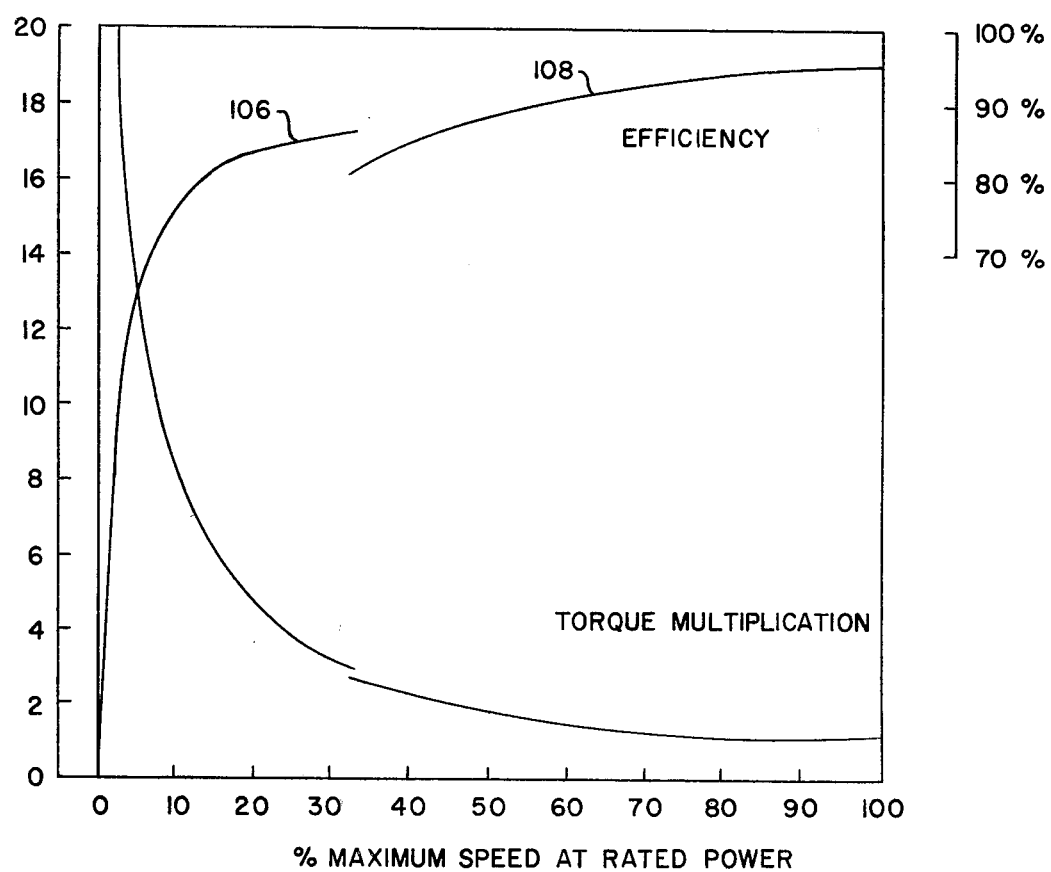
FIG. 7 is a graph in which operating efficiency and torque multiplication values for the embodiment illustrated in FIG. 4 are plotted against the percentage of maximum speed at rated power of that embodiment.

It will be noted that in the described operation of the system illustrated in FIG. 4, synchronous operation of the I.V. unit is effected through two ranges of system output speed variation and further that the external gear set 90 at no time operates as an epicyclic unit. Also with reference to FIG. 7 of the drawings, the operating efficiency of the system in the two modes of operation are represented respectively by the curves 106 and 108. Because the gear reduction factor in the external gear set during power transmissions through the central unit output shaft 70, overall efficiency is increased in some measure because of the reduced torque loading on the rolling surfaces of the I.V. unit. The higher range of operation during which torque is transmitted from the unit by the hollow output shaft 72, the efficiency of the unit is not only high but relatively flat because of the relatively small variation in torque multiplication at high speed operation.

If it is desired to operate the system of FIG. 4 in the reverse mode, the clutches C1 and C3 are disengaged while the clutch C2 is engaged to lock the external gear set as a unit thereby effecting an output drive from the gear 96 through the gear 98 to the system output shaft 100. In this mode of operation, torque output from the I.V. unit 10 is through the sun gear 80 and the central shaft 70 to provide system output shaft operation proportional to the values represented by the line 84 in FIG. 3 of the drawings.

In an alternative embodiment illustrated in FIG. 5 of the drawings, an infinitely variable transmission is provided for applications in which a relatively narrow range of reverse operation is necessary and in which a relatively high output/input speed ratios are desired in forward operation. An example of such an application is an automotive vehicle. In this embodiment, an external gear set is again provided and in which parts corresponding to those identified in the previous embodiment are designated by the same reference numerals but primed. The unit sun gear 82 and shaft 70 extend to a cutch C2 by which the shaft 70 may be coupled directly to a system output shaft 100'. In this system, the unit gearing function k is selected to be 0.64 to provide a range C represented by the line 107 in FIG. 3 of the drawings.

Also in this embodiment, negative speed values in FIG. 3 are forward speeds whereas positive speed values are reverse speeds.

Thus, in operation of the embodiment of FIG. 5 where the shaft 70 is coupled directly with the system output shaft 100', the I.V. unit would be initially adjusted so that the function $\rho$ provides a neutral condition or a condition in which no rotation of the shaft 70 would occur upon rotation of the input shaft 32. By shifting the value $\rho$ upwardly toward its maximum value, a low forward mode of operation would occur. Correspondingly, by decreasing the value $\rho$, a reverse operational mode of the system would occur. When the value $\rho$ reaches its maximum value of 2.31, the clutch C2 is disengaged and the clutch C1 engaged to couple output shaft 100' with the central gear 88' of the external gear set 90. This gear will be driven by the ring gear 94' through the planets 102' which are at all times anchored against planetary or orbital movement. Transmission from the unit ring gear 78 will operate in conjunction with the external gear set 90' to effect an overdrive output or an operation in which the system output shaft 100 is driven at speeds in excess of the tubular unit shaft 72. Also the gear set reverses the direction of shaft rotation so that values represented by the line 86 in FIG. 3 are transposed to inverted negative values as represented by the 86' in FIG. 3. The operation of the embodiment illustrated in FIG. 5, synchronous operation of the I.V. unit 10 is again effected as in the previous embodiment.

In FIG. 6, the embodiment is shown in which both unit output shafts 70 and 72 are adapted to be alternately connected directly with a system output shaft 100". In this latter system, the gear reduction function k1 is selected to be 0.69. Hence, operation with the clutch C2" engaged will parallel reverse, neutral and low range forward operation of the embodiment described above with respect to FIG. 5. Operation in a higher range of output/input speed ratios is elected by disengaging the clutch C2" and engaging the clutch C1" so that the system output is from the hollow unit output shaft 72. In shifting between the two ranges with the embodiment of FIG. 6, synchronous operation is not possible. It is, therefore, required that the value of $\rho$ be adjusted quickly from one end of its limits to the other in shifting between the two ranges.

Thus it will be seen that as a result of the present invention, a highly effective infinitely variable transmission unit and system are provided by which the above mentioned objectives are completely fulfilled. It is also contemplated that modifications may be made in the disclosed embodiment without departure from the inventive concepts manifested thereby. Accordingly, it is expressly intended that the foregoing is illustrative of preferred embodiments only, not limiting, and that the true spirit and scope of the present invention be determined by reference to the appended claims.

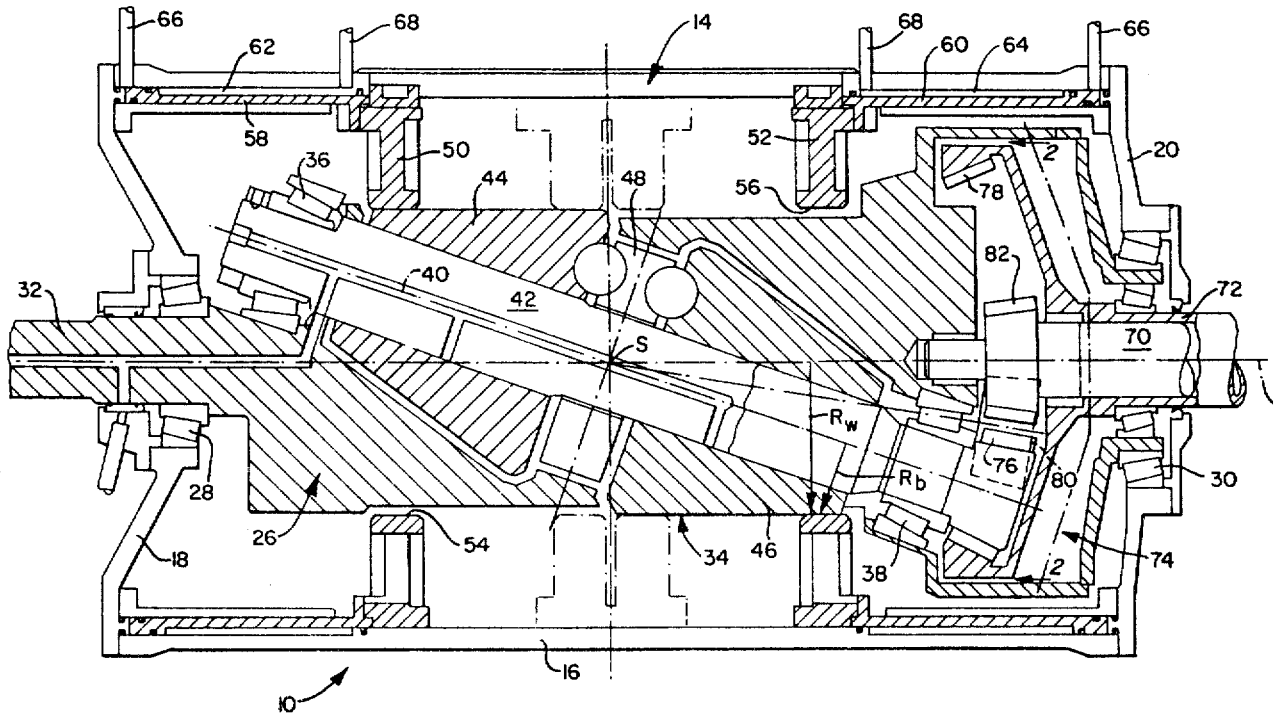

I claim:

1. An infinitely variable torque transmission system comprising:
    a system input;
    a system output;
    an I.V. unit including an alpha body rotatable on a first axis and drivably connected with said system input, a beta body having a beta rolling surface of revolution about a second axis, said beta body being carried by said alpha body so that said second axis is inclined with respect to and intersecting said first axis at a point of axes intersection, and an omega body having an omega rolling surface of revolution about said first axis, one of said beta and omega rolling surfaces being of variable radii whereas the other of said rolling surfaces is of relatively constant radius, said rolling surfaces being in frictional engagement at each other at a contact point, means for adjusting the position of said contact point to vary the ratio of said rolling surface radii, a pair of rotatable unit output shafts, first fixed ratio means for combining movement of at least two of said alpha, beta and omega bodies to drive one of said unit output shafts in a first range of unit output speeds for a given system input speed dependent on variation of said ratio of rolling surface radii and second fixed ratio means for combining movement of the same two of said alpha, beta and omega bodies to drive the other of said unit output shafts in a second different range of unit output speeds for said given input speed dependent also on variation of said ratio of rolling surface radii; and
    means for alternately coupling one or the other of said unit output shafts to said system output and to provide at least two system ranges of output/input speed ratios.

2. The apparatus recited in claim 1, wherein said means for alternately coupling one or the other of said unit output shafts to said system output comprises gearing to define a third fixed ratio means combinable with at least one said first and second fixed ratio means to substantially equate the maximum output/input speed ratio of one of said system ranges to the minimum output/input speed ratio of the other of said ranges.

3. The apparatus recited in claim 2, wherein said means for alternately coupling one or the other of said unit output shafts to said system output comprises fourth fixed ratio means combinable with one of said first and second fixed ratio means alternately with said third fixed ratio means.

4. The apparatus recited in claim 3, wherein said fourth fixed ratio means comprises means to effect a direct 1:1 connection of said system output shaft with one of said unit output shafts.

5. The apparatus recited in claim 2, wherein said first, second and third fixed ratio means are related to each other and to said ratio of rolling surface radii so that variations of said ratio of rolling surface radii between minimum and maximum values is in opposite directions of variation for the same direction of speed variation in each of said system ranges, whereby the value of said ratio of rolling surface radii is the same for said substantially equated maximum and minimum speed ratios.

6. The apparatus recited in either of claims 2 or 5, wherein said gearing comprises means combinable with one of said first or second ratio means to reverse the direction of system output in at least one of said system ranges.

7. The apparatus recited in either of claims 2 or 5, wherein said unit output shafts are rotatable in opposite directions for the same direction of system input rotation and wherein said third fixed ratio means operates to reverse the direction of rotation resulting from the one of said first and second fixed ratio means with which it is combinable.

8. The apparatus recited in either of claims 2 or 5, wherein said gearing is simple gearing so that no torque transmitted thereby is recirculated to either of said unit output shafts.

9. The apparatus recited in claim 5, wherein a combination of one of said first and second fixed ratio means and the range of variation in said ratio of rolling surface radii causes a directional reversal in one of said unit output shafts as said ratio of rolling surface radii is varied between minimum and maximum values in one direction of variation.

10. In an infinitely variable transmission unit including an alpha body rotatable on a first axis and drivably connected with a unit input, a beta body having a beta rolling surface of revolution about a second axis, said beta body being carried by said alpha body so that said second axis is inclined with respect to and intersecting said first axis at a point of axes intersection, and an omega body having an omega rolling surface of revolution about said first axis, one of said beta and omega rolling surfaces being of variable radii whereas the other of said rolling surfaces is of relatively constant radius, said rolling surfaces being in frictional engagement at each other at a contact point, means for adjusting the position of said contact point to vary the ratio of said rolling surface radii, the improvement comprising:
    a pair of rotatable unit output shafts;
    first fixed ratio means for combining movement of at least two of said alpha, beta and omega bodies to drive one of said unit output shafts in a first range of speeds for a given system input speed dependent on variation of said ratio of rolling surface radii; and
    second fixed ratio means for combining movement of the same two of said alpha, beta and omega bodies to drive the other of said unit output shafts in a second different range of speeds for said given input speed dependent also on variation of said ratio of rolling surface radii.

11. The apparatus recited in claim 10, wherein movement of said alpha and beta bodies are combined to drive said output shafts.

12. The apparatus recited in claim 11, wherein said first fixed ratio means comprises a drive pinion coupled at one end of said beta body and a sun gear on one of said output shafts drivably connected with said drive pinion; and wherein said second fixed ratio means comprises said drive pinion and a ring gear in mesh with said drive pinion and coupled for rotation with the other of said output shafts.

13. The apparatus recited in claim 12, wherein said first fixed ratio means further comprises an idler gear carried rotatably by said alpha body, said idler gear meshing with both said sun gear and said drive pinion.

* * * * *

UNITED STATES PATENT AND TRADEMARK OFFICE
CERTIFICATE OF CORRECTION

PATENT NO. : 4,233,859

DATED : November 18, 1980

INVENTOR(S) : Yves J. Kemper

It is certified that error appears in the above-identified patent and that said Letters Patent is hereby corrected as shown below:

The title page should be deleted to appear as per attached title page.

Signed and Sealed this

Thirteenth Day of July 1982

[SEAL]

Attest:

Attesting Officer

GERALD J. MOSSINGHOFF

Commissioner of Patents and Trademarks

United States Patent [19]

Kemper

[11] 4,233,859
[45] Nov. 18, 1980

[54] INFINITELY VARIABLE TRANSMISSION UNIT AND SYSTEM INCORPORATING SAME

[75] Inventor: Yves J. Kemper, Birmingham, Mich.

[73] Assignee: Vadetec Corporation, Troy, Mich.

[21] Appl. No.: 80,221

[22] Filed: Oct. 1, 1979

Related U.S. Application Data

[63] Continuation of Ser. No. 955,264, Jul. 31, 1979, abandoned.

[51] Int. Cl.³ .................... F16H 37/06; F16H 15/16
[52] U.S. Cl. .................................... 74/690; 74/191
[58] Field of Search ...................... 74/690, 191, 192

[56] References Cited

U.S. PATENT DOCUMENTS

| | | | |
|---|---|---|---|
| RE. 293,328 | 8/1977 | Kemper | 74/690 X |
| 1,207,216 | 12/1916 | Roberts | 74/193 |
| 1,242,618 | 10/1917 | Stevens | 74/690 |
| 1,709,346 | 4/1929 | Garrard | 74/690 X |
| 2,126,508 | 8/1938 | Schmitter | 74/281 |
| 2,353,136 | 7/1944 | Bade | 74/690 |
| 3,299,744 | 1/1967 | Kraus | 74/690 X |
| 3,406,597 | 10/1968 | Perry | 74/865 |
| 3,695,120 | 10/1972 | Titt | 74/690 |
| 4,098,145 | 7/1978 | Dickinson | 74/690 |

FOREIGN PATENT DOCUMENTS 2533475 10/1978 Fed. Rep. of Germany
1227486 8/1960 France
1338321 8/1963 France

*Primary Examiner*—Leslie Braun
*Attorney, Agent, or Firm*—Robert F. Ziems

[57] ABSTRACT

An infinitely variable (I.V.) transmission unit having a single input and at least two independently rotatable outputs driven by rolling friction surfaces with a variable radius ratio and by unit contained gearing. The separate output shafts are coupled with distinct gear reduction functions to a single I.V. functioning or working unit to enable different output/input speed ratio ranges to be achieved by each unit output.

The unit is combined with a simple external gear set and clutching to provide diverse system operation in which the range of I.V. operation is enlarged. Also, synchronous operation of the system is achieved with no external epicyclic gear operation.

13 Claims, 7 Drawing Figures